US006611196B2

(12) United States Patent
Mynatt et al.

(10) Patent No.: US 6,611,196 B2

(45) Date of Patent: Aug. 26, 2003

(54) SYSTEM AND METHOD FOR PROVIDING AUDIO AUGMENTATION OF A PHYSICAL ENVIRONMENT

(75) Inventors: Elizabeth D. Mynatt, San Francisco, CA (US); Maribeth Back, San Francisco, CA (US); Roy Want, Los Altos, CA (US); Jason Ellis, Atlanta, GA (US); W. Keith Edwards, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/045,447

(22) Filed: Mar. 20, 1998

(65) Prior Publication Data

US 2002/0053979 A1 May 9, 2002

(51) Int. Cl.[7] .................................................. G06F 7/00

(52) U.S. Cl. .................. 340/5.8; 379/220.01; 381/73.1

(58) Field of Search ....................... 340/825.34, 825.49, 340/825.31, 944, 539, 825.54, 7.58, 7.62, 384.1, 384.3; 370/313; 379/56; 250/353; 345/158; 381/73.1; 348/484, 563, 729

(56) References Cited

U.S. PATENT DOCUMENTS

| | | | | | |
|---|---|---|---|---|---|
| 4,081,617 | A | | 3/1978 | Clark | 179/84 T |
| 4,395,600 | A | * | 7/1983 | Lundy et al. | 381/173.1 |
| 4,660,022 | A | * | 4/1987 | Osaka | 340/384.3 |
| 4,682,159 | A | * | 7/1987 | Davison | 345/158 |
| 5,659,691 | A | | 8/1997 | Durward et al. | 395/329 |
| 5,661,699 | A | | 8/1997 | Sutton | 367/132 |
| 5,784,546 | A | | 7/1998 | Benman, Jr. | 395/154 |

OTHER PUBLICATIONS

Benjamin B. Bederson et al., "Computer–Augmented Environments: New Places to Learn, Work, and Play", Advances in Human Computer Interaction, vol. 5, Ch. 2, pp. 37–66, 1995.

"Projects From Beyond The Grave: Intermezzo", http://www.parc.xerox.com/csl/members/kedwards/intermezzo.html, 2 pages W. Keith Edwards, "Coordination Infrastructure in Collaborative Systems", Georgia Institute of Technology, College of Computing, Atlanta, GA, pp. 1–148, Dec. 1995 (obtained via the Internet).

W. Keith Edwards, "Coordination Infrastructure in Collaborative Systems", Georgia Institute of Technology, College of Computing, Atlanta, GA, pp. 1–175, Dec. 1995 (obtained from Georgia Tech Library).

W. Keith Edwards, "Policies and Roles in Collaborative Applications", Proceedings of the ACM Conference on Computer–Supported Cooperative Work (CSCW), Boston, MA, 10 pages, 1996.

W. Keith Edwards, "Session Management For Collaborative Applications", Proceedings of the ACM Conference on Computer–Supported Cooperative Work (CSCW), Chapel Hill, NC, 8 pages, 1994.

W. Keith Edwards, "Representing Activity in Collaborative Systems", Proceedings of the Sixth IFIP Conference on Human Computer Interaction (Interact), Sydney, Australia, 8 pages, 1997.

"Very Nervous System (1986–1990)", David Rokeby (http://www.interlog.com/~drokeby/vns.html), printed on Jan. 24, 2001.

(List continued on next page.)

*Primary Examiner*—Michael Horabik
*Assistant Examiner*—William Bangachon
(74) *Attorney, Agent, or Firm*—Fay, Sharpe, Fagan, Minnich & McKee, LLP

(57) ABSTRACT

A system and method are provided for implementing the transmission of information to users—via peripheral, or background, auditory cues—in response to the physical action of the users in a particular environment, e.g., the workplace. The system combines three known technologies: active badges, distributed systems, and digital audio delivered via portable wireless headphones.

23 Claims, 9 Drawing Sheets

OTHER PUBLICATIONS

"Alive: Artificial Life Interactive Video Environment" (http://lcs.www.media.mit.edu/projects/alive/), printed on Jan. 24, 2001.

Installations: Silicon Remembers Carbon (1993–2000), D. Rokeby (http://www.interlog.com/~drokeby/src.html), printed on Jan. 24, 2001.

"Crickets: Tiny Computers for Big Ideas", F. Martin, B. Silverman, M. Resnick, B. Mikhak, R. Borovoy, and R. Berg (http://www.lcs.www.mit.edu/people/fredm/projects/cricket/), printed on Jan. 24, 2001.

"Things that blink: Computationally augmented name tags", R. Borovoy, M. McDonald, F. Martin, and M. Resnick (http://www.research.ibm.com/journal/sj/mit/sectionc/borovoy.html), © 1996 IBM, printed on Jan. 24, 2001.

Antenna Gallery Guide™ (Antenna, P.O. Box 176, Sausalito, CA), document dated Sep. 1996.

Mark Weiser, "Some Computer Issues in Ubiquitous Computing" (Communications of the ACM, vol. 36 No. 7 pp. 76–84 (1993).

W.C. Hill, J.D. Hollan, D. Wroblewski, and T. McCandless, "Edit Wear and Read Wear" CHI '92 Conf. Proc., ACM Conference on Human Factors in Computing Systems, May 3–7, 1992, Montery, CA).

R. Want, A. Hopper, V. Falcão, and J. Gibbons, "The Active Badge Location System", ACM Transactions on Information Systems, vol. 10 No. 1, Jan. 1992, pp. 91–102.

Lenny Foner, MIT Media Laboratory, "Artificial Synthesisia via Sonification: A Wearable Augmented Sensory System", (http://www.santafe.edu/~icad/ICAD96/proc96/foner.htm), printed on Apr. 13, 2001.

J. Rekimoto and K. Nagao, "The World through the Computer: Computer Augmented Interaction with Real World Environments", (UIST '95 Eighth Annual Symposium on User Interface Software and Technology, Nov. 14–17, 1995, Pittsburgh, PA).

The Acoustiguide Inform System (http://www.acoustiguide.com/what/inform.html) printed on Jan. 24, 2001.

"Augmented Reality Interface"(http://www.cc.gatech.edu/computing/classes/cs6751_94_fall/groupn/part2/augmented.html), printed on Jan. 24, 2001.

Tangible Bits: Towards Seamless Interfaces between People, Bits & Atoms (Proceedings of CHI/97, Mar. 22–27, 1997).

Audio Augmented Reality: A Prototype Automated Tour Guide (Bell Communications Research, CHI/95).

Advances in Human–Computer Interaction (Nielsen, 1995).

Electronic Mail Previews Using Non–Speech Audio (Hudson & Smith, CHI/96).

Effective Sounds in Complex Systems: The Arkola Simulation (Gaver, Smith & O'Shea, 1991/ACM).

Aroma: Abstract Representation of Presence Supporting Mutual Awareness (Pedersen & Sokoler, CHI/97).

* cited by examiner

FIG. 5
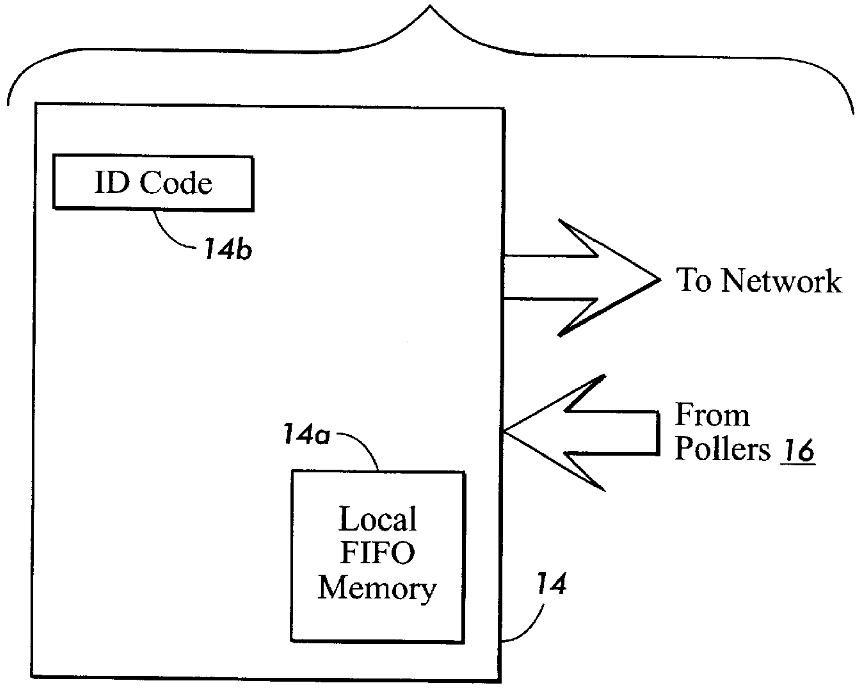
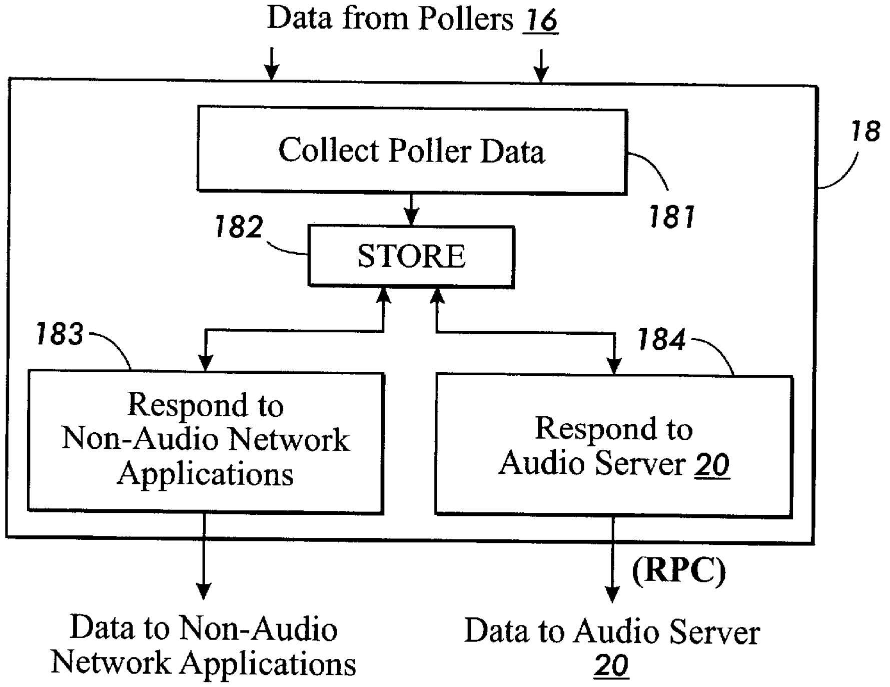
FIG. 6

SYSTEM AND METHOD FOR PROVIDING AUDIO AUGMENTATION OF A PHYSICAL ENVIRONMENT

BACKGROUND OF THE INVENTION

This invention relates to a system for providing unique audio augmentation of a physical environment to users. More particularly, the invention is directed to an apparatus and method implementing the transmission of information to the users—via peripheral, or background, auditory cues in response to the physical but implicit or natural action of the users in a particular environment, e.g., the workplace. The system in its preferred form combines three known technologies: active badges, distributed systems, and digital audio delivered via portable wireless headphones.

While the invention is particularly directed to the art of audio augmentation of the physical workplace, and will be thus described with specific reference thereto, it will be appreciated that the invention may have usefulness in other fields and applications.

Considering the richness and variety of activities in the typical workplace, interaction with computers is relatively limited and explicit. Such interaction is primarily limited to typing and mousing into a box while seated at a desk. The dialogue with the computer is explicit. That is, we enter in commands and the computer responds.

Part of the reason that interaction with computers is relatively mundane is that computers are not particularly well designed to match the variety of activities of the typical human being. For example, we walk around, get coffee, retrieve the mail, go to lunch, go to conference rooms and visit the offices of coworkers. Although some computers are now small enough to travel with users, such computers do not take advantage of physical actions.

It would be advantageous to leverage everyday physical activities. For example, an opportune time to provide serendipitous, yet useful, information by way of peripheral audio is when a person is walking down the hallway. If the person is concentrating on their current task, he/she will likely not even notice or attend to the peripheral audio display. If, however, the person is less focused on a particular task, he/she will naturally notice the audio display and perhaps decide to attend to information posted thereon.

Additionally, it would be advantageous if physical actions could guide the information content. For example, a pause at a coworker's empty office is an opportune time for the user to hear whether their coworker has been in the office earlier that day.

Unfortunately, known systems do not provide for these types of interactions with computer systems. Most work in augmented reality systems has focused on augmenting visual information by overlaying a visual image of the environment with additional information, usually presented as text. A common configuration of these systems is a hand-held device that can be pointed at objects in the environment. A video image with overlays is displayed in a small window.

These types of hand-held systems have two primary disadvantages. First, users must actively probe the environment. The everyday pattern of walking through an office does not trigger the delivery of useful information. Second, users only view a representation of the physical world, and cannot continue to interact with the physical world.

Providing auditory cues based on the motion of users in a physical environment has also been explored by researchers and artists, and is currently used for gallery and museum tours. These include a system described by Bederson, et al., "Computer Augmented Environments: New Places to Learn, Work and Play", in *Advances in Human Computer Interaction,* Vol. 5, Ablex Press. Here, a linear, usually cassette-based audio tour is replaced by a non-linear sensor-based digital audio tour, allowing the visitor to choose their own path through a museum. A commercial version of the Bederson system is believed to be produced under the name Antenna Galley Circle™.

Several disadvantages of this system exist. First, in Bederson's system, users must carry the digital audio with them, imposing an obvious constraint on the range and generation of audio cues that can be presented. Second, Bederson's system is unidirectional. It does not send information from a user to the environment such as the identity, location, or history of the particular user.

Other investigations into audio awareness include Hudson, et al., "Electronic Mail Previews Using Non-Speech Audio", *CHI '96 Conference Companion,* ACM, pp. 237–238, who demonstrated providing iconic auditory summaries of newly arrived e-mail when a user flashed a colored card while walking by a sensor. This system still required active input from the user and only explored one use of audio in contrast to creating an additional auditory environment that does not require user input.

Explorations in providing awareness data and other forms of serendipitous information illustrate additional possible scenarios in this design space. Ishii et al.'s "Tangible Bits: Towards Seamless Interfaces Between People, Bits and Atoms", in *Proc. CHI'97*, ACM, March 1997, focuses on surrounding people in their office with a wealth of background awareness cues using light, sound and touch. This system does not follow the user outside of their office and does not provide for the triggering of awareness cues based on the activities of the user.

Gaver et al., "Effective Sound in Complex Systems: The ARKola Simulation", *Proc. CHI'91*, ACM Press, pp. 85–90, explored using auditory cues in monitoring the state of a mock bottling plant. Pederson et al., "AROMA: Abstract Representation of Presence Supporting Mutual Awareness", *Pro. CHI'97*, ACM Press, 51–58, has also explored using awareness cues to support awareness of other people.

Another area of computing that relates generally to electronically monitoring information concerning users and machines, including state and locational or proximity information, is called "ubiquitous" computing. The ubiquitous computing known, however, does not take advantage of audio cues on the periphery of the perception of humans.

The following U.S. patents commonly owned by the assignee of the present invention generally relating to ubiquitous computing are incorporated herein by reference:

| U.S. Pat. No. | Inventor | Issue Date |
|---|---|---|
| 5,485,634 | Weiser et al. | Jan. 16, 1996 |
| 5,530,235 | Stefik et al. | Jun. 25, 1996 |
| 5,544,321 | Theimer et al. | Aug. 6, 1996 |
| 5,555,376 | Theimer et al. | Sep. 10, 1996 |
| 5,564,070 | Want et al. | Oct. 8, 1996 |
| 5,603,054 | Theimer et al. | Feb. 11, 1997 |
| 5,611,050 | Theimer et al. | Mar. 11, 1997 |
| 5,627,517 | Theimer et al. | May 6, 1997 |

Therefore, it would be advantageous if a system was provided that: 1) transmitted useful information to a user via peripheral audio cues, such transmission being triggered by the passive interaction of the user in, for example, the workplace, 2) allowed the user to continue to interact in the physical environment, physically uninterrupted by the transmission, 3) allowed the user to carry only lightweight communication hardware such as badges and wireless headphones or earphones instead of more constraining devices such as hand held processors or CD players and the like, and 4) accomplished and manipulated bidirectional communication between the user and the system.

The present invention contemplates a new audio augmentation system which achieves the above-referenced advantages, and others, and resolves appurtenant difficulties.

SUMMARY OF THE INVENTION

In the subject invention, audio is used to provide information that lies on the edge of background awareness. Humans naturally use their sense of hearing to monitor the environment, e.g., hearing someone approaching, hearing someone saying a name, and hearing that a computer's disk drive is spinning. While in the midst of some conscious action, ears are gathering information that persons may or may not need to comprehend.

Accordingly, audio (primarily non-speech audio) is a natural medium to create a peripheral display in the human mind. A goal of the subject invention is thus to leverage these natural abilities and create an interface that enriches the physical world without being distracting to the user.

The subject invention is also designed to be serendipitous. That is, the information is such that one appreciates it when heard, but does not necessarily rely on it in the same way that one relies on receiving a meeting reminder or an urgent page. The reason for this distinction should be clear. Information that one relies on must penetrate beyond a user's peripheral perceptions to ensure that it has been perceived. This, of course, does not imply that serendipitous information is not of value. Conversely, many of our actions are guided by the wealth of background information in our environment. Whether we are reminded of something to do, warned of difficulty along a potential path, or simply provided the spark of a new idea, opportunistic use of serendipitous information makes lives more efficient and rich. The goal of the subject invention is to provide useful, serendipitous information to users by augmenting the environment via audio cues in the workplace.

Thus, in accordance with the present invention, a system and method for providing unique audio augmentation of a physical environment is implemented. An active badge is worn by a user to repeatedly emit a unique infrared signal detected by a low cost network of infrared sensors placed strategically around a workplace. The information from the infrared sensors is collected and combined with other data sources, such as on-line calendars and e-mail cues. Audio cues are triggered by changes in the system (e.g. movement of the user from one room to another) and sent to the user's wireless headphones.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit of the scope of the invention will become apparent to those skilled in the art.

DESCRIPTION OF THE DRAWINGS

The present invention exists in the construction, arrangement, and combination of the various parts of the device and steps of the methods, whereby the objects contemplated are attained as hereinafter more fully set forth, and specifically pointed out in the claims, and illustrated in the accompanying drawings in which:

FIG. 5 is a functional diagram illustrating a sensor according to the present invention;

FIG. 6 is a functional block diagram illustrating a location server of the present invention;

DETAILED DESCRIPTION OF THE PREFERRED EMBODIMENTS

Figure 1:
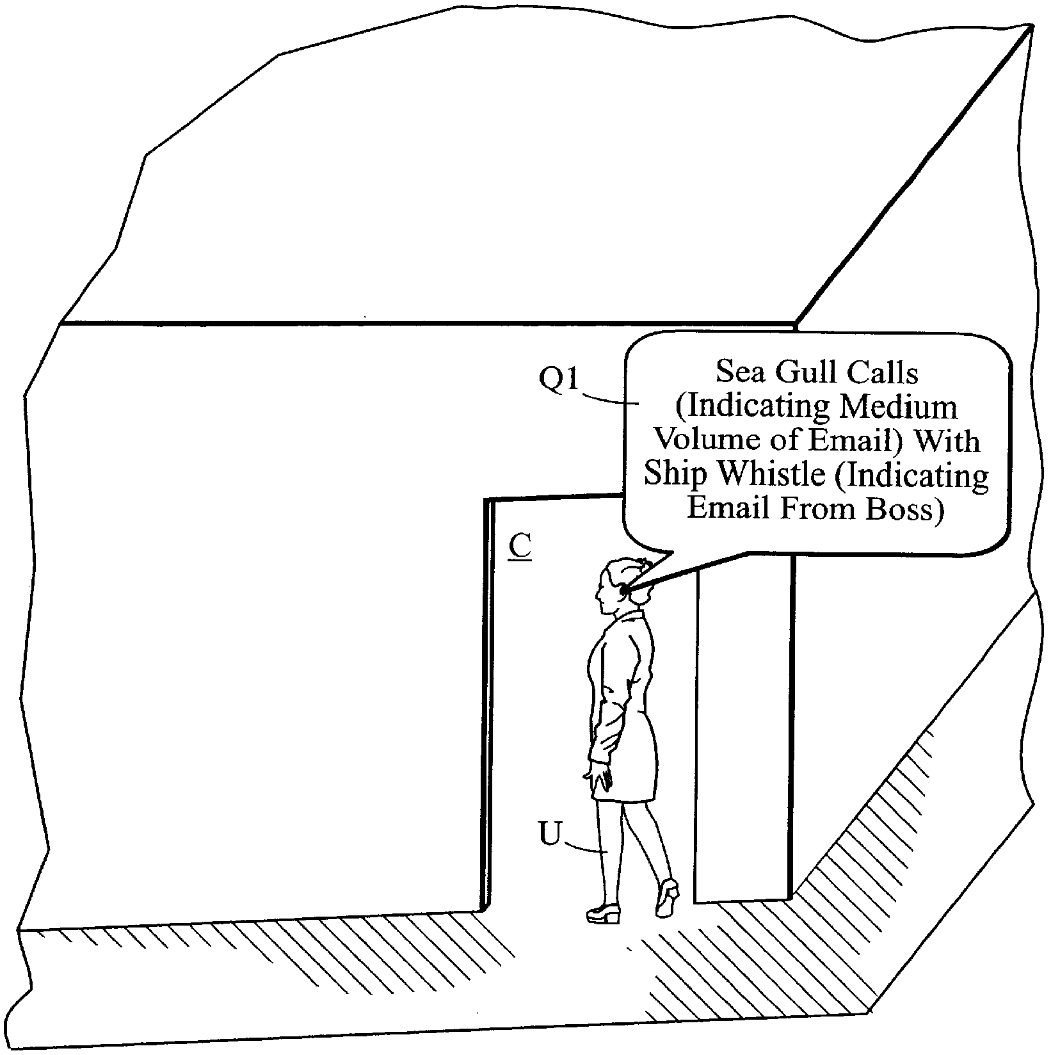
FIG. 1 is an illustration of an exemplary application of the present invention.

Before describing the details of the present invention, it is important to note that the preferred embodiment takes into account a number of scenarios that were devised based on observation. These scenarios primarily touch on issues in system responsiveness, privacy, and the complexity and abstractness of the information presented. Each scenario grew out of a need for different types of serendipitous information. Three such scenarios are exemplary.

First, the workplace can often be an e-mail oriented culture. Whether there is newly-arrived e-mail, who it is from and what it concerns are often important. Workers typically run by their offices between meetings to check on this important information pipeline.

Another common between-meeting activity is entering the "bistro", or coffee lounge, to retrieve a cup of coffee or tea. An obvious tension experienced by workers is whether to linger with a cup of coffee and chat with colleagues or return to one's office to check on the latest e-mail messages. The present invention ties these activities together. When a user enters the bistro, an auditory cue is transmitted to the user that conveys approximately how many new e-mail messages have arrived and indicates the source of the messages from particular individuals and/or groups.

Second, workers tend to visit the offices of coworkers. This practice supports communication when an e-mail message or phone call might be inappropriate or too time consuming. When a visitor is faced with an empty office, he/she may quickly survey the office trying to determine if the desired person has been in that day.

With the present system, when the user enters the office of the coworker, an auditory cue is transmitted to the user indicating whether the coworker has been in that day, whether the coworker has been gone for some time, or whether the coworker just left the office. It is important to note that in one embodiment these transmitted auditory cues are preferably only qualitative. For example, the cues do not report that "Mr. X has been out of the office for two hours and forty-five minutes." The cues—referred to as "footprints" or location cues—merely give a sense to the user that is comparable to seeing an office light on or a briefcase against the desk or hearing a passing colleague report that the coworker was just seen walking toward a conference room.

Third, many workers are not physically located near coworkers in a particular work group. Thus, these workers do not share a palpable sense of their work group's activity—the group pulse—as compared to the sense of activity shared by a work group that is co-located. In this scenario, various bits of information about individuals in a group become the basis for an abstract representation of a "group pulse." Whether people are in the office that day, if they are working with shared artifacts, or if a subset of them are collaborating in a face-to-face meeting triggers changes in this auditory cue. As a continuous sound, the group pulse becomes a backdrop for other system cues.

It is recognized, of course, that the present invention is not limited to only these three scenarios. These are merely examples of suitable implementations of the invention. Other applications would clearly fall within the scope of the present invention. For example, the invention could be applied to serve as a reminder to a user to speak with another individual once that individual comes into close proximity. Another exemplary application might involve conveying new book title information to a user if the user remains in a location for a predetermined amount of time, e.g. standing near a bookshelf.

Several sets, or ecologies, of auditory cues for each of the three exemplary scenarios were created. Each sound was crafted with attention to its frequency content, structure, and interaction with other sounds. To explore a range of use and preference, four sound environments composed of one or more sound ecologies were created. The sound selections for e-mail quantity and the group pulse are summarized in Tables 1 and 2.

TABLE 1

Examples of sound design variations between types for e-mail quantity

| | Sound Effects | Music | Voice | Rich |
|---|---|---|---|---|
| Nothing new | a single gull cry | high, short bell melody, rising pitch at end | "You have no e-mail" | Same as SFX; a single gull cry |
| A little (1–5 new) | a gull calling a few times | high, somewhat longer melody, falling at end | "You have n new messages | a few gulls crying |
| Some (5–15 new) | a few gulls calling | lower, longer melody | "You have n new messages | a few gulls calling |
| A lot (more than 15 new) | gulls squabbling, making a racket | longest melody, falling at end | "You have n new messages" | gulls squabbling, making a racket |

TABLE 2

Examples of sound design variations for group pulse

| | Sound Effects | Music | Voice | Rich |
|---|---|---|---|---|
| Low activity | distant surf | vibe | none preferred but must be peripheral | combination of surf and vibe |
| Medium activity | closer waves | same vibe, with added sample at lower pitch | none preferred but must be peripheral | combination of closer waves and vibe |
| High activity | closer, more active waves | as above, three vibes at three pitches and rhythms | none preferred but must be peripheral | combination of waves and vibe, more active |

Similarly, sound design variations may be designated for the third exemplary use of the system 10, i.e. receiving an auditory cue (for example, buoy bells or other sound effects, music, voice or a combination thereof) when entering a coworker's office. As noted above, audio cues may be implemented that indicate whether the coworker is present that day, has been out for quite some time, or has just left the office.

Figure 2:
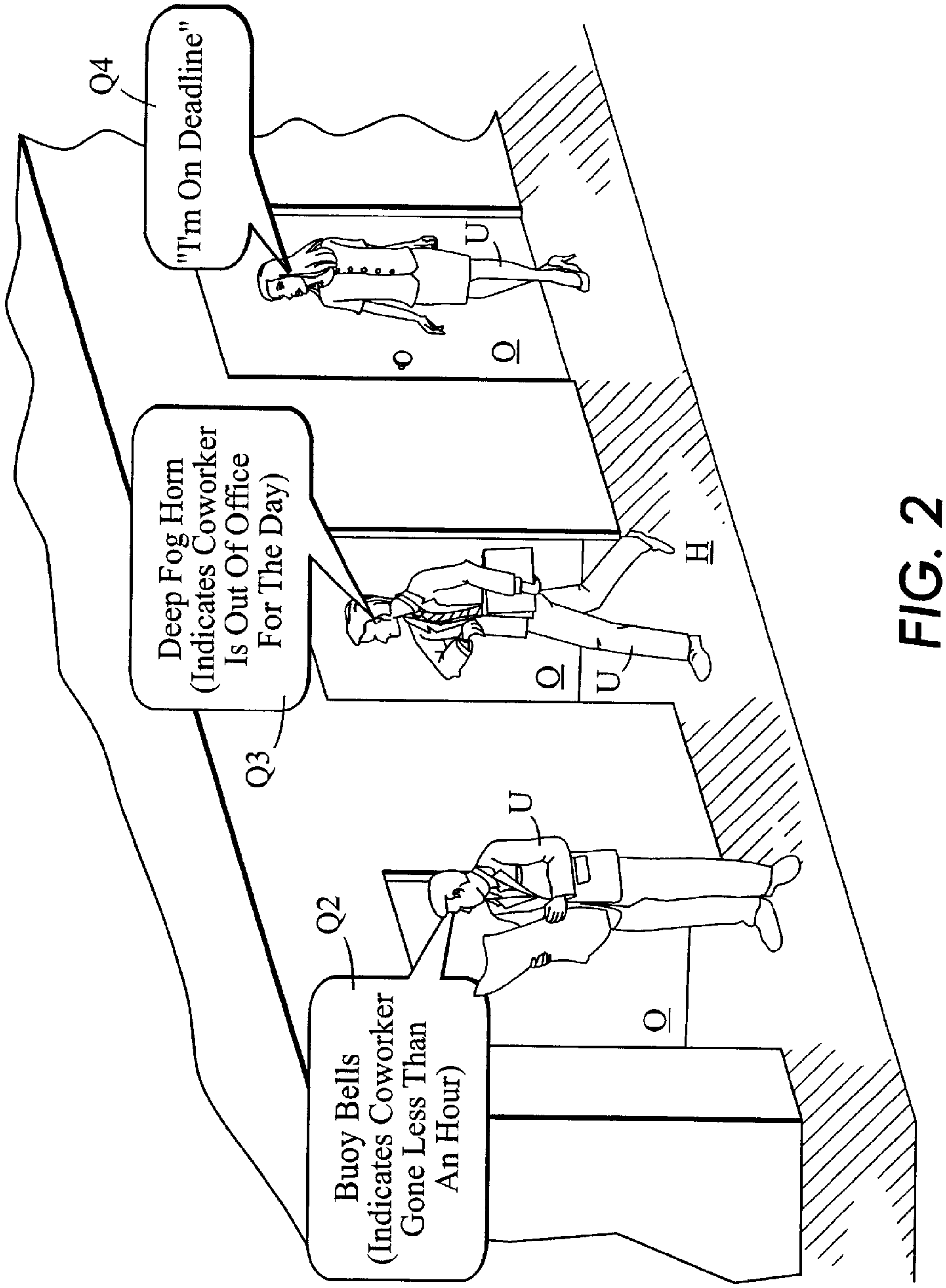
FIG. 2 is an illustration of another exemplary application of the present invention.
Figure 3:
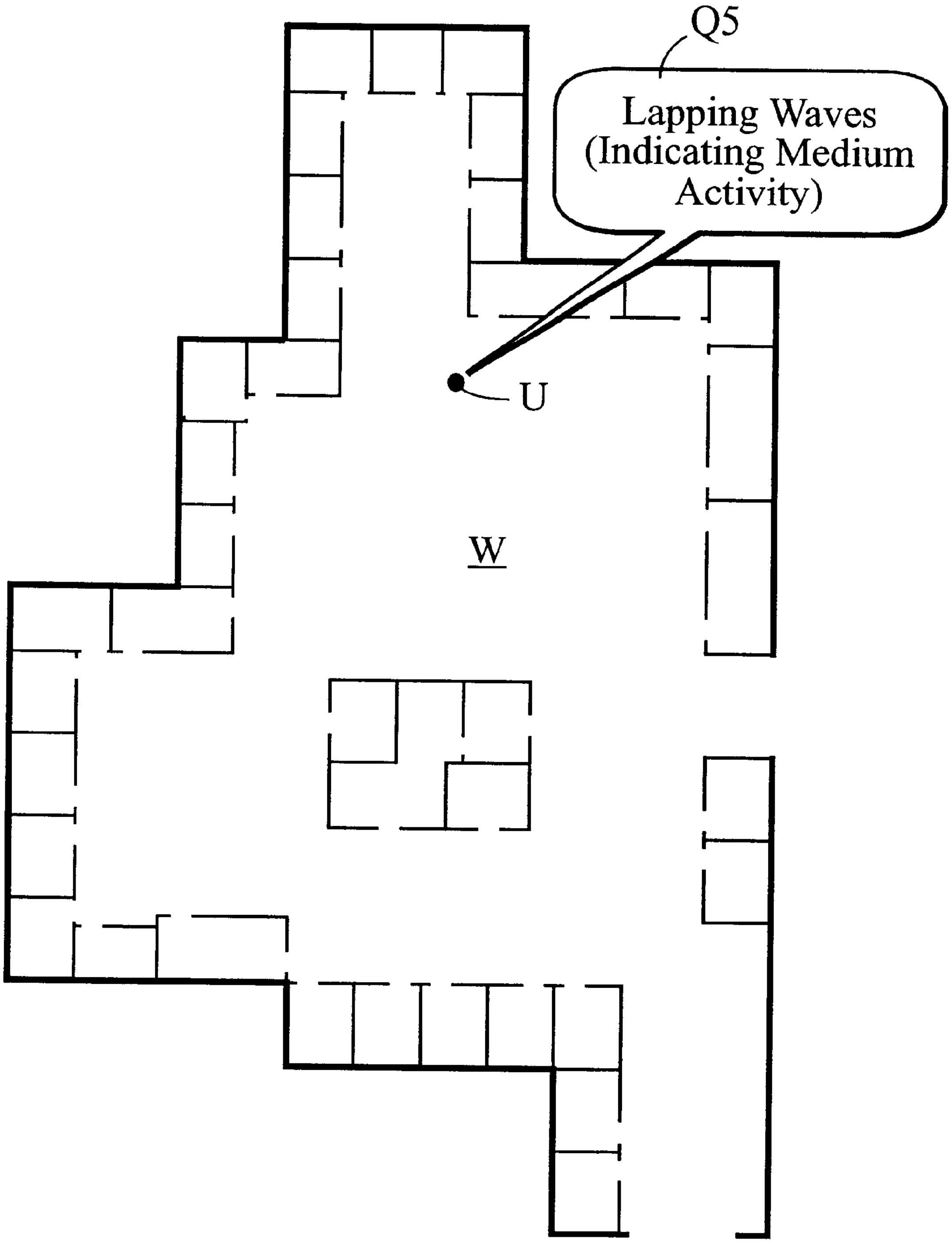
FIG. 3 is an illustration of still yet another exemplary application of the present invention.

Referring now to the drawings wherein the showings are for purposes of illustrating the preferred embodiments of the invention only, and not for purposes of limiting same, FIGS. 1–3 illustrate the implementation of the above referenced exemplary applications of the present system. For example, as illustrated in FIG. 1, when a user U enters the coffee lounge C in the preferred embodiment, a sound file is triggered and an auditory cue Q1 is sent to the user's headphones (illustratively shown by a "balloon" in FIG. 1) that indicates the number of e-mail messages recently received and the content thereof. In FIG. 2, auditory cues Q2, Q3, Q4 (sent to the user's headphones and illustratively shown by the "balloons" in FIG. 2) indicating a variety of information are triggered by the user U when lingering at the threshold of doors of the offices O of co-workers. Referring to FIG. 3, the group pulse is monitored by the system and global proximity sensors trigger a group pulse sound file upon the user's entering of the workplace W and an auditory cue Q5 (illustratively shown as a "balloon" in FIG. 3) is sent to the user U. It will be understood that although text phrases indicate the meanings of Q1–Q5 in FIGS. 1–3, the actual auditory cues presented to the user can be, for example, music, sound effects, voice, or a rich combination thereof as shown in, for example, Tables 1 and 2 above.

Figure 4:
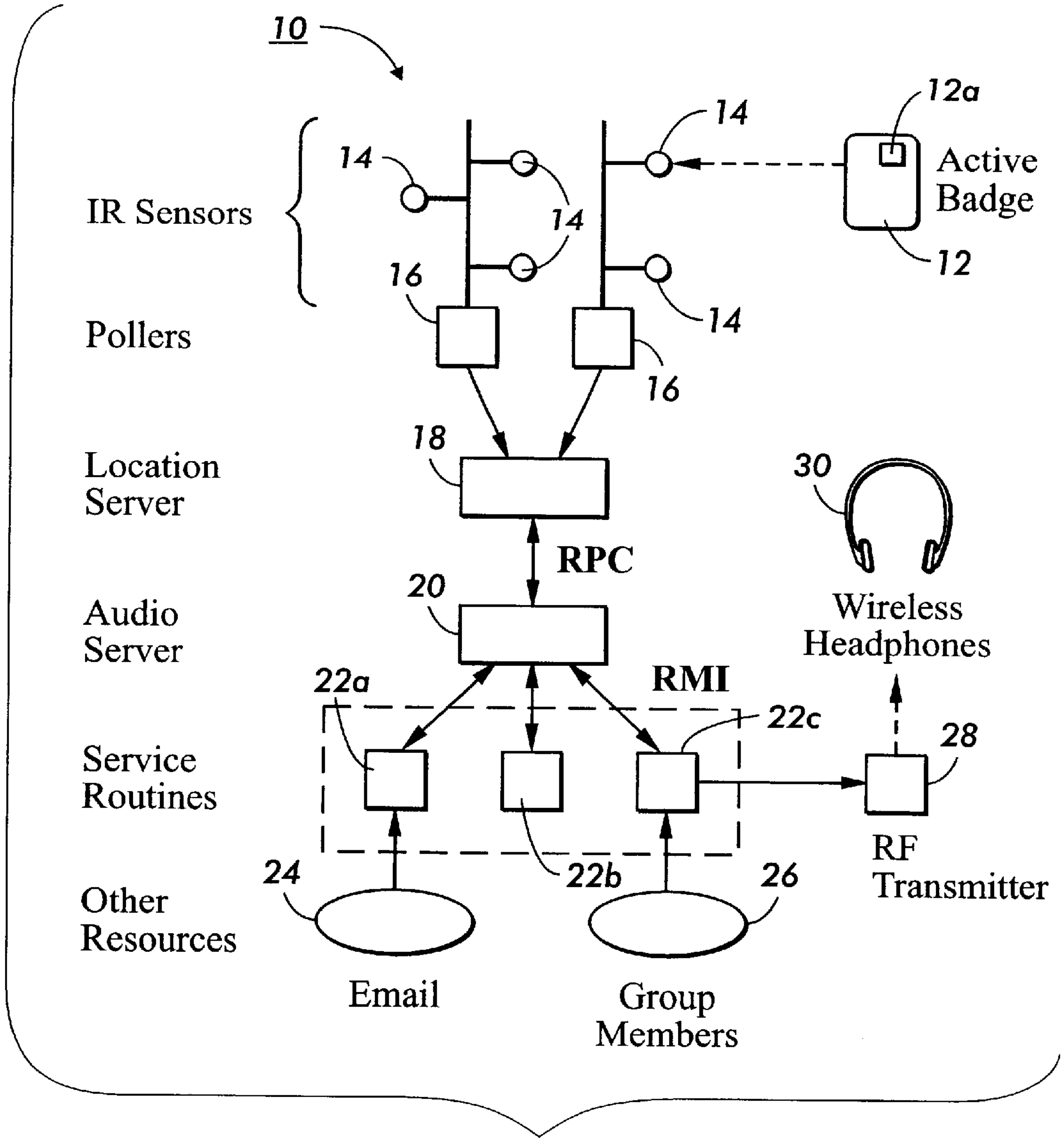
FIG. 4 is a block diagram illustrating the preferred embodiment of the present invention.

FIG. 4 is a block diagram illustrating the overall preferred embodiment. As shown, a system 10 is comprised of at least one active badge 12 and a plurality of sensors 14, preferably infrared (IR) sensors. The system further comprises pollers 16 that poll the sensors 14. Also included in the system is a location, or first, server 18 and an audio, or second, server 20. The audio server 20 communicates with exemplary service routines **22*a* (e-mail service routine), 22*b* (location or footprints service routine) and 22*c* (group pulse service routine). Other resources, such as an e-mail resource 24 and group member activity resource 26**, may also be provided.

Output data from the service routines **22*a–c* may be transmitted through a transmitter 28 (preferably a radio frequency (RF) transmitter), which transmits data to the user via, for example, wireless headphones 30 that are worn by the users who are also wearing the active badges 12**.

More particularly and with continuing reference to FIG. 4, the active badges such as active badge 12 are worn by users and designed to track the locations of users in a workplace. The number of active badges depends upon the number of users. Preferably, each active badge has a unique identification code 12*a* that corresponds to the user wearing the badge. The system 10 operates on the premise that a person desiring to be located wears the active badge 12. The badge 12 emits a unique digitally coded infrared signal that is detected by the network of sensors 14, approximately once every fifteen seconds, preferably.

Active badges are known; however, those known operate on the premise that individuals spend more time stationary than in motion and, when they move, it is at a relatively slow rate. Accordingly, the active badges 12 preferably have a beacon period of about 5 seconds. This increased frequency results in badge locations being determined on a more regular basis. As those skilled in the art will appreciate, this increase in frequency also increases the likelihood of signal collision. This is not considered to be a factor if the number of users is few; however, if the number of users increases to the point where signal collision is a problem, it may be advantageous to slightly increase the beacon period.

The sensors 14 are placed throughout the subject environment (preferably the workplace) at locations corresponding to areas that will require the system 10 to feed back information to the user based upon activity in a particular area. For example, a sensor 14 may be placed in each room and at various locations in hallways of a workplace. Larger rooms may contain multiple sensors to ensure good coverage. Each sensor 14 monitors the area in which it is located and preferably detects badges 12 within approximately twenty-five feet.

Badge signals are received by the sensors 14, represented in the block diagram of FIG. 5, and stored in a local FIFO memory 14*a*. It should be appreciated that a variety of suitable sensors could be used as those skilled in the art will appreciate. Each sensor 14 preferably has a unique network identification code 14*b* and is preferably connected to a wired network of at least 9600 baud that is polled by a master station, referred to above as the pollers 16. When a sensor 14 is read by a poller 16, it returns the oldest badge sighting contained in its FIFO and then deletes it. This process continues for all subsequent reads until the sensor 14 indicates that its FIFO is empty, at which point the poller 16 begins interrogating a new sensor 14. The poller 16 collects information that associates locations with badge IDs and the time when the sensors were read.

As with the known active badges, known pollers operate on the premise that individuals spend more time stationary than in motion and, when they move, it is at a relatively slow rate. Accordingly, in the preferred embodiment, the speed of the polling cycle is increased to remove any wait periods in the polling loop. In addition, a single computer (or a plurality of computers, if necessary) is dedicated to polling to avoid delays that may occur as a result of the polling computer sharing processing cycles with other processes and tasks.

A large workplace may contain several networks of sensors 14 and therefore several pollers 16. As a result, to provide a useful network service that can be conveniently accessed, the poller information is centralized in the location server 18. This is represented in FIG. 4.

Location server 18 processes and segregates the badge identification/location information data and resolves the information into human understandable text. Queries can then be made on the location server 18 in order to match a person or a location, and return the associated data. The location server 18 also has a network interface that allows other network clients, such as the audio server 20, to use the system.

Referring now to FIG. 6, a functional diagram of the location server 18 is shown. The location server 18 collects data from the poller 16 (block 181) and stores this data by way of a simple data store procedure (block 182). The location server 18 also functions to respond to non-audio network applications (block 183) and sends data to those applications. The location server 18 also functions to respond to the audio server 20 (block 184) and send data thereto via remote procedure calls (RPC).

Audio server 20 is the so-called nerve center for the system. In contrast to the location server 18, the audio server 20 provides two primary functions, the ability to store data over time and the ability to easily run complex queries on that data. When the audio server 20 starts, it creates a baseline table ("csight") that is known to exist at all times. This table stores the most recent sightings for each user.

After the server 20 has updated each table with new positioning data, it executes all queries for service routines 22*a–c*. If any of the queries have hits, it notifies the appropriate service routine and feeds it the results. Service routines 22*a–c* can also request an ad hoc query to be executed immediately. This type of query is not installed and is executed only once.

Figure 7:
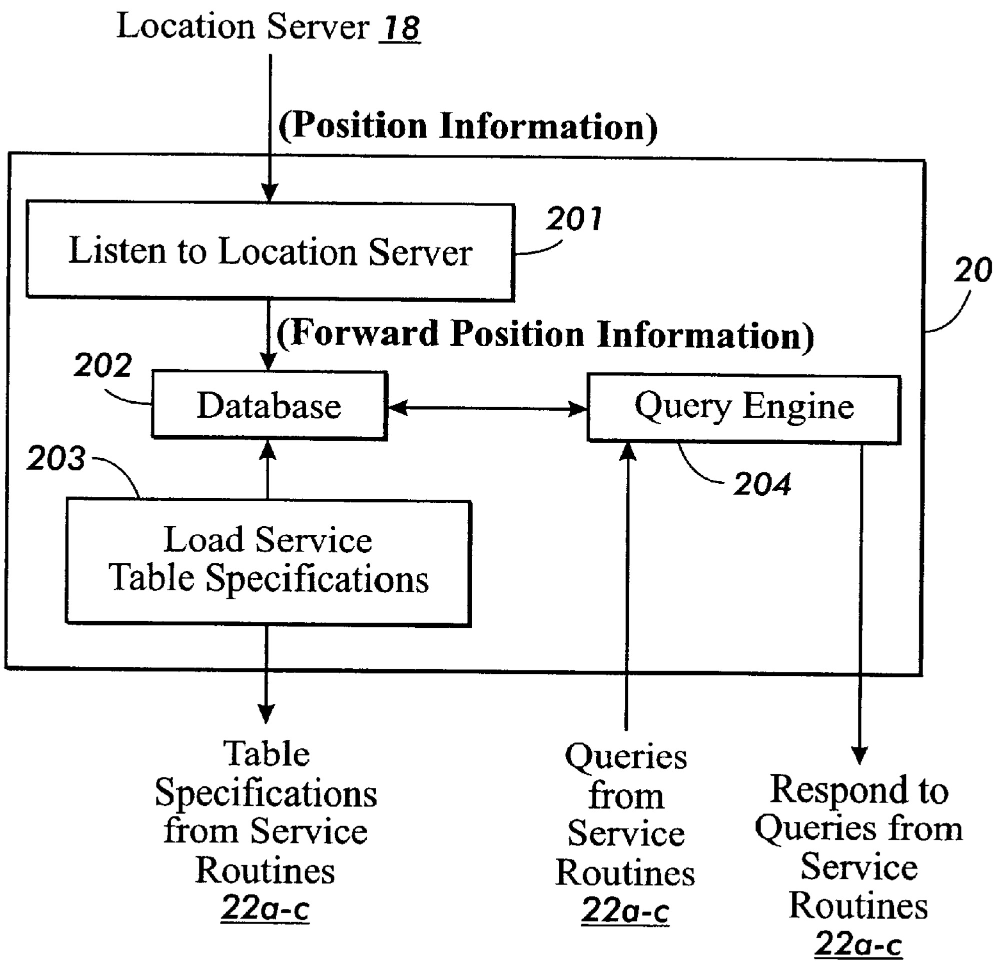
FIG. 7 is a functional block diagram illustrating an audio server according to the present invention.

Referring now to the functional diagram of FIG. 7, the audio server 20 listens to the location server 18 by gathering position information therefrom (block 201) and forwarding the position information to a database (block 202). The database also has loaded therein table specifications from the service routines 22*a–c* (block 203). In addition, as shown, the audio server 20 is provided with a query engine (block 204) that receives queries from the service routines 22*a–c* and responses to queries from the service routines 22*a*–22*c*.

In the preferred embodiment, a location server 18 and an audio server 20 are provided. However, it should be recognized that these two servers could be combined so that only a single server is used. For example, a location server thread or process and an audio server thread or process can run together on a single server computer.

The actual code for the audio server 20 is written in the Java programming language and communicates with the location server 18 via RPC. For convenience, this Java programming language code (as well as that for the service routines) utilized in the preferred embodiment is attached hereto as Appendix A. In this regard, a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Most of the computation occurs within the audio server 20. This centralization reduces network bandwidth because the audio server 20 need not update multiple data repositories each time it obtains new data. The audio server 20 need only send data over the network when queries produce results. This technique also reduces the load on client, or user, machines.

Audio service routines 22*a–c* are also written in Java (refer to Appendix A) and 1) inform the audio server 20 via remote method invocation (RMI) what data to collect and 2) provide queries to run on that data. That is, when a service routine 22*a–c* is registered with the audio server 20, two things are specified—data collection specifications and queries. After a service routine 22*a–c* starts the data specification and queries are communicated to the audio server 20, the service routine 22*a–c* simply awaits notification of the results of the query.

The service routines 22_a–c_ correspond to the three primary exemplary applications discussed herein, i.e. e-mail, footprints, and group pulse. It should be understood that any number or type of service routines could be implemented to meet user needs.

Each of the data collection specifications results in the creation of a table in the server 20. The data specification includes a superkey, or unique index, for the table as well as a lifetime for that table. As noted above, when the server 20 receives new data, the specification is used to decide if the data is valid for the table and if it replaces other data.

Queries to run against the tables are defined in the form of a query object. This query language provides the subset of structured query language (SQL) relevant to the task domain. It supports cross products and subsets, as well as optimizations, such as short-circuit evaluation.

When queries to the audio server 20 result in "hits", the audio server 20 returns the results to the appropriate service routines 22_a–c_. A returned query from the audio server 20 may result in the service routine playing an auditory cue via transmitter 28, gathering other data, invoking another program and/or sending another query to the audio server 20.

The pseudo-code for implementing a service routine is as follows:

```
Connect to audio server
Load in user configuration (identity, sound, parameters,
  constraints)
  identity (who is this user, what is their office number)
  sound is what sounds the user would like to play;
  parameters such as:
    how much is "a little" e-mail
    in "what location" does the user hear the group pulse
    location of Email queue constraints such as lifetime of
      data
Create table specifications
  for n tables
    specify name of table
    specify column definitions (e.g., user, location, time,
      confidence)
    specify lifetime
Build queries
  for m queries
    specify table
    specify query type (normal, crossproduct)
    specify interval
    specify result form (records, count)
    specify clauses (field/value pairs)
Send table and query specifications to audio server
Load sounds
Wait for query match (); {waiting for an RMI message}
Receive query-match message
  decode data
    set local data (e.g., time last entered loc-x)
  if needed, submit another query
  if needed, pull in additional information (e.g., status of
    e-mail queue)
  if appropriate, trigger sound output
```

As Java applications, these service routines 22_a–c_ can also maintain their own state as well as gather information from other sources. Referring back to FIG. 4, an e-mail resource 24 and a resource 26 indicating the activity of other members of the user's work group are provided.

The query language in the present system is heavily influenced by the database system used which, in the preferred embodiment, is modeled after an Intermezzo system. The Intermezzo system is described in W. Keith Edwards, *Coordination Infrastructure in Collaborative Systems*, Ph.D. dissertation, Georgia Institute of Technology, College of Computing, Atlanta, Ga. (December 1995). Additional discussions can be found on the internet at www.parc.xerox.com/csl/members/kedwards/intermezzo.html. It should be recognized that any suitable database would suffice. This language is the subset of SQL most relevant to the task domain, supporting the system's dual goals of speed and ease of authoring. A query involves two objects: "AuraQuery", the root node of the query that contains general information about the query as a whole, and "AuraQuery Clause", the basic clause that tests one of the fields in a table against a user-provided value. All clauses are connected by the boolean AND operator.

As an example, the following query returns results when "John" enters room 35-2107, the Bistro or coffee lounge. First, the query is set with attributes, such as its ID, what table it refers to, and whether it returns the matching records or a count of the records. The clauses in the query are described by specifying field-value pairs. The pseudocode for specifying a query is as follows:

```
auraQuery aq;
auraQueryClause aqc;
aq=new auraQuery();
/* ID we use to identify query results */
aq.queryId = 0;
/* current sightings table */
aq.queryTable = "csight";
/* NORMAL or CROSS_PRODUCT */
aq.queryType = auraQuery.NORMAL;
/* return RECORDS or a COUNT of them */
aq.resultForm = auraQuery.RECORDS
/* we've seen John */
aqc = new auraQueryClause();
aqc.field = "user;
aqc.cmp = auraQueryClause.EQ;
aqc.val = "John";
aq.clauses.addElement(aqc);
/*John is in the bistro */
aqc=new auraQueryClause();
aqc.field = "locID";
aqc.cmp = auraQueryClause.EQ;
aqc.val = "35-2107";
aq.clauses.addElement(aqc);
/*John just arrived in the bistro */
aqc=new auraQueryClause();
aqc.field = "newLocation";
aqc.cmp = auraQueryClause.EQ;
aqc.val = "new Boolean (true)";
aq.clauses.addElement(aqc);
```

As alluded to above, if a query is satisfied and the resultant action is the transmission of an audio cue, the transmitter 28 transmits the audio signal to wireless headphones 30 that are worn by the user that performed the physical action that prompted the query. Of course, as those of skill in the art will appreciate, many different types of communication hardware might be used in place of the RF transmitter and wireless headphones, or earphones.

The system 10 is, of course, configurable to meet specific user needs. Configuration of the system is accomplished by, for example, editing text files established for specifying parameters used by the service routines 22_a_–22_c_.

Figure 8:
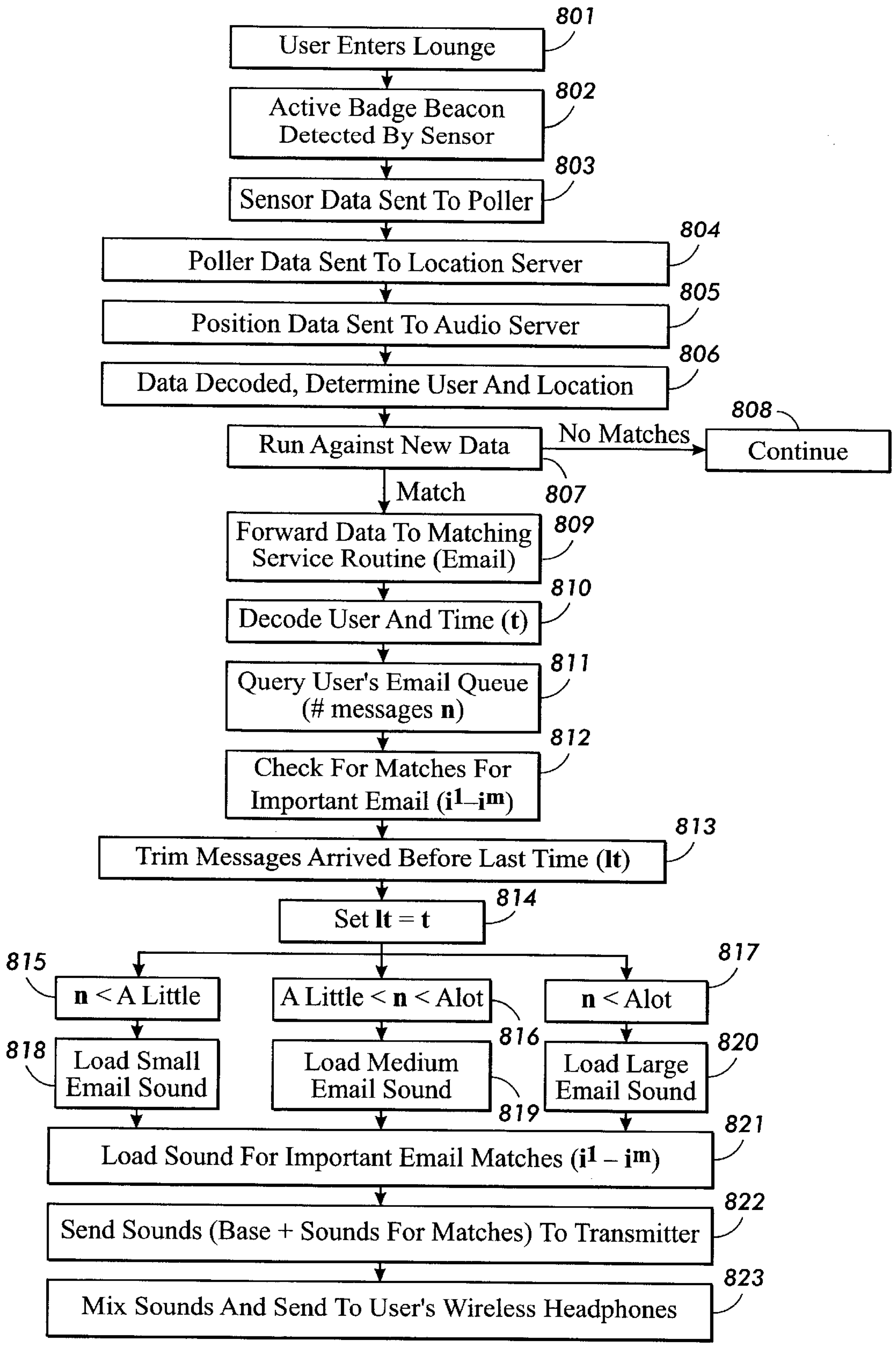
FIG. 8 is a flow chart showing an exemplary application of the present invention.
Figure 9:
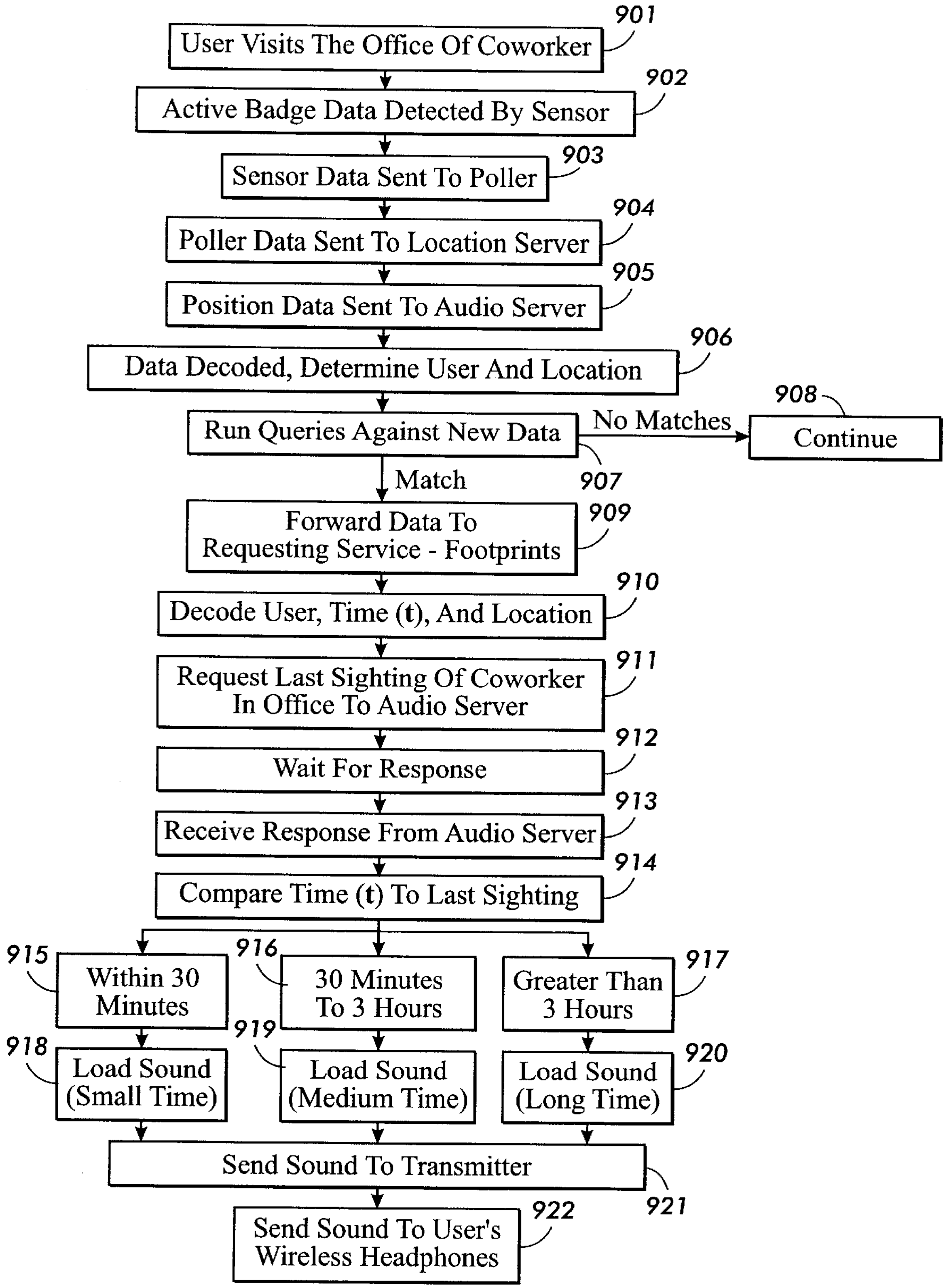
FIG. 9 is a flow chart showing an exemplary application of the present invention; and, FIG. 10 is a flow chart showing an exemplary application of the present invention.
Figure 10:
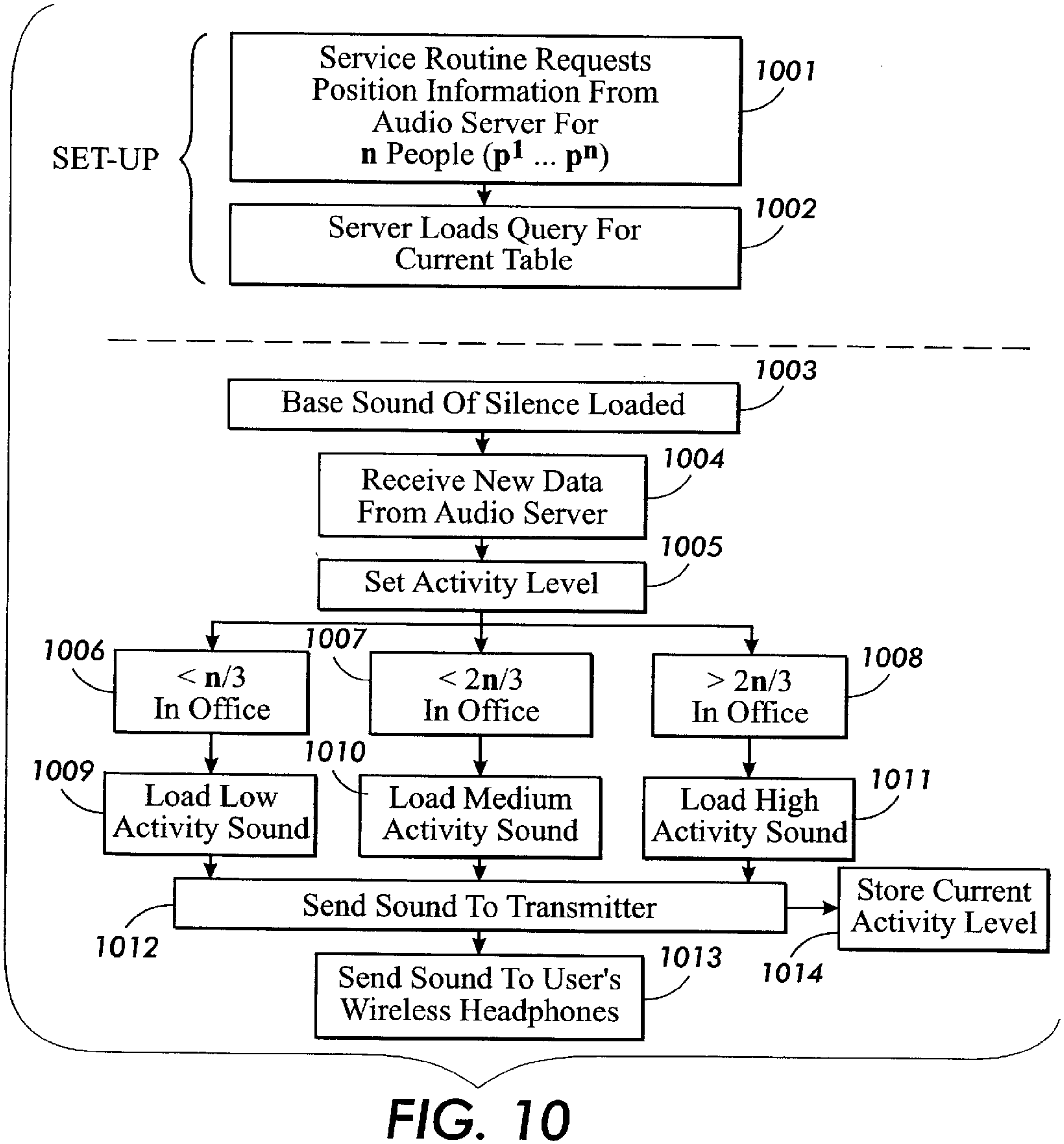

Having thus described the components and other aspects of the system 10, the operation (or select methods) of the system upon a detection of a user engaging in a conduct that triggers the system is illustrated in the flowcharts of FIGS. 8–10. More particularly, the "e-mail" scenario, "footprint" scenario, and "group pulse" scenario referenced above are described.

With reference to FIG. 8, a user enters a room, e.g. the coffee lounge, (step 801) and the active badge 12 worn by the user is detected by the sensor 14 located in the coffee lounge (step 802). The sensor data is collected by the poller 16 (step 803) and sent to the location server 18 (step 804). Position data processed by the location server 18 is then forwarded to the audio server 20 (step 805) where the data is decoded and the identification of the user and the location of the user is determined (step 806). Queries are then run against the data (step 807). If no matches are found, the system continues to run in its normal state (step 808). If, however, matches are found, the data is forwarded to the e-mail service routine 22*a* (step 809). The system then decodes the user identification and the time (t) that the user entered the lounge (step 810). The user's e-mail queue is then queried (# messages=n) (step 811). A check is then made for "important" e-mail messages (step 812). The system then trims the messages that arrived before the last time (lt) that the user entered the lounge (step 813) and lt is then set equal to t (step 814). It is then determined whether the number of messages is less than a little, between a little or a lot, or greater than a lot (steps 815–817). Then, respective sounds that correspond to the number of e-mail messages are loaded (steps 818–820). Sounds are also loaded for "important" messages (821) and all sounds are then sent to transmitter 28 (step 822). Sounds are then mixed and sent to wireless headphones 30 worn by the user (step 823).

Referring now to FIG. 9, the application of the system wherein a user visits the office of co-worker i.e. "footprints" application, is illustrated. As shown, a user visits a co-workers office (step 901) and the active badge worn by the user is detected by the sensor 14 in the office (step 902). The sensor data is then sent to poller 16 (step 903), the poller data is sent to the location server 18 (step 904), and position data is then sent to the audio server 20 (step 905). The data is then decoded to determine the identification of the user and the location of the user (step 906). Queries are then run against the new data (step 907) and, if no match is found, the system continues normal operation (step 908). If a match is found, data is forwarded to the footprints service routine 22*b* (step 909). The user identification, time (t) that the user visited the office and location of the user are then decoded (step 910). A request is then made to determine the last sighting of the co-worker in her office to the audio server 20 (step 911). The system then awaits for a response (step 912). When a response is received from the audio server 20 (step 913) the time (t) is then compared to the last sighting (step 914). The comparison determines whether the last sighting was within 30 minutes, between 30 minutes and 3 hours, or greater than 3 hours (steps 915–917). Accordingly, corresponding appropriate sounds are then loaded (steps 918–920). The sounds are sent to the transmitter 28 (step 921) and consequently to the users headset (step 922).

The group pulse is monitored as follows. Referring to FIG. 10, the system is initialized by requesting position information from the audio server 20 for n people ($p^1 \ldots p^n$) (step 1001). The server 20 loads the query for the current table (step 1002). In operation, a base sound of silence is loaded (step 1003). New data is then received from the audio server 20 (step 1004). An activity level (a) is then set (step 1005). A determination is then made whether the activity level is low, medium, or high (steps 1006–1008). As a result of the determination of the activity level, activity sounds are loaded (steps 1009–1011). The sounds are then sent to the transmitter 28 (step 1012) and to the users wireless headphones (step 1013). The activity level is also stored as the current activity level (step 1014).

Importantly, because this system is intended for background interaction, the design of the auditory cues preferably avoids the "alarm" paradigm so frequently found in computational environments. Alarm sounds tend to have sharp attacks, high volume levels, and substantial frequency content in the same general range as the human voice (200–2,000 Hz). Most sound used in computer interfaces has (sometimes inadvertently) fit into this model. The present system deliberately aims for the auditory periphery, and the system's sounds and sound environments are designed to avoid triggering alarm responses in listeners.

One aspect of the design of the present system is the construction of sonic ecologies, where the changing behavior of the system is interpreted through the semantic roles sounds play. For example, particular sets of functionalities can be mapped to various beach sounds. In the current sound effects design, the amount of e-mail is mapped to seagull cries, e-mail from particular people or groups is mapped to various beach birds and seals, group activity level is mapped to surf, wave volume and activity, and audio footprints are mapped to the number of buoy bells.

Another idea explored by the system in these sonic ecologies is imbedding cues into a running, low level soundtrack, so that the user is not startled by the sudden impingement of a sound. The running track itself carries information about global levels of activity within the building or within a work group. This "group pulse" sound forms a bed within which other auditory information can lie.

One useful aspect of the ecological approach to sound design is considering frequency bandwidth and human perception as limited resources. Given this design perspective, sounds must be built with attention to the perceptual niche in which each sound resides.

Within each design model, several different types of sounds, variation of harmonic content, pitch, attack and decay, and rhythms caused by simultaneously looping sounds of different lengths, were created. For example, by looping three long, low-pitched sounds without much high harmonic content and with long, gentle attacks and decays, a sonic background in which room is left for other sounds to be effectively heard is created. In the music environment this sound if a low, clear vibe sound; in the sound effects environment it is distant surf. These sounds share the sonic attributes described above.

The system offers a range of sound designs: voice only, music only, sound effects only, and a rich sound environment using all three types of sound. These different types of auditory cues, though mapped to the same type of events, afford different levels of specificity and required awareness. Vocal labels, for example, provide familiar auditory feedback; at the same time they usually demand more attention than a non-speech sound. Because speech intends to carry foreground information, it may not be appropriate unless the user lingers in a location for more than a few seconds. For a user who is simply walking through an area, the sounds remain at a peripheral level, both in volume and in semantic content. Of course, it is recognized that there may be instances where speech is entirely appropriate, e.g., auditory cue Q4 in FIG. 2.

The above description merely provides a disclosure of particular embodiments of the invention. It is not intended for the purpose of limiting the same thereto. As such, the invention is not limited to only the above-described embodiments. Rather, it is recognized that one skilled in the art could conceive alternative embodiments that fall within the scope of the invention.

Having thus described the invention, we hereby claim:

1. A system for providing audio augmentation of a physical environment to users, the system comprising:

an active badge associated with each user continuously emitting a digitally encoded infrared signal, each badge having a unique identification information;

a plurality of sensors positioned at selected locations in the physical environment for receiving badge signals, each sensor including a FIFO queue for storing received badge signals and having unique identification information;

at least one poller that selectively polls the plurality of sensors, wherein each sensor sequentially downloads the received badge signals from the FIFO queue to the poller and wherein the at least one poller collects positioning information that associates the selected location with the unique identification information of polled active badges with a time that the each sensor was read;

a first server for processing and aggregating the positioning information;

a second server for storing the positioning information and processing queries, wherein the positioning information is stored in table form and updated by the second server;

a plurality of service routines provided to the second server, each of the plurality of service routines determining a peripheral auditory signal for said each user based on the query processing of the second server, the peripheral auditory signal being in signal range other than in a subliminal signal range and other than a signal within a full conscious area of a person's recognition;

means for transmitting the peripheral auditory signal to the user; and, means for receiving the transmitted peripheral auditory signal.

2. The system according to claim 1 wherein the receiving means comprises wireless headphones for use by the each user.

3. The system according to claim 1 wherein the transmitting means comprises a radio frequency transmitter.

4. The system according to claim 1 wherein each of the service routines are configured to provide the queries supplied to the second server.

5. The system according to claim 1 wherein the service routines include at least one of e-mail, footprints, and group pulse, the e-mail service routine configured to inform a user, via the peripheral auditory signal, of the existence of an e-mail, the footprints service routine configured to provide location cues to inform a user, via the peripheral auditory signal, as to a recency another person has been at a location, and the group pulse routine configured to provide the user, via the peripheral auditory signal, with a sense of an activity level of a defined group of users.

6. The system according to claim 1 wherein the service routines include at least one of footprints, and group pulse, the footprints service routine configured to provide location cues to inform a user, via the peripheral auditory signal, as to a recency another person has been at a location, and the group pulse routine configured to provide the user, via the peripheral auditory signal, with a sense of an activity level of a defined group of users.

7. An audio augmentation apparatus, comprising:

a plurality of active badges, at least one of the active badges associated with a corresponding user, each active badge being provided with unique identification information;

a plurality of sensors positioned at selected locations in a physical environment for receiving active badge signals, and having unique identification information;

at least one poller that selectively polls the plurality of sensors, wherein each sensor downloads the received active badge signals to the poller, and wherein the at least one poller collects positioning information that associates the selected location with the unique identification information of polled active badges with a time each of the sensors was read;

a server configured to process the positioning information, to store the positioning information, and to process queries;

a plurality of service routines provided to the server, each of the plurality of service routines determining corresponding peripheral auditory signals based on query processings by the server, wherein a particular service routine of the plurality of service routines is selected dependent upon the positioning information, and queries related to the particular service routine are generated, the results of the queries generating a particular peripheral auditory signal;

means for transmitting the particular peripheral auditory signal to the user; and means for receiving the transmitted particular peripheral auditory signal by the user.

8. The audio augmentation apparatus according to claim 7 wherein the active badges periodically emit a unique digitally coded infrared signal designed to be detected by the sensors.

9. The audio augmentation apparatus according to claim 8 wherein a beacon period setting the periodicity of the active badges is approximately five seconds.

10. The audio augmentation apparatus according to claim 7 wherein the sensors are configured to sense an area of approximately twenty-five feet.

11. The apparatus according to claim 7, wherein the peripheral auditory signal is in a signal range other than in a subliminal signal range and other than a signal within a full conscious area of a person's recognition.

12. A method of providing audio augmentation within a defined physical environment, comprising:

carrying, by a user, an active badge which emits an identification signal;

entering, by a user, into an area of the physical environment within which are sensors capable of sensing the identification signal;

detecting, by the sensors, data emitted from the active badge;

downloading the sensed data from one of the sensors to a poller;

sending the polled data, which represents position data of a user, to a location server;

sending the position data from the location server to an audio server;

determining the user of the active badge and the location of the user, by the audio server;

selecting a type of service routine to be implemented in accordance with the data regarding the user and the location of the user;

implementing the selected service routine;

loading a selected peripheral sound to the audio server, the selected peripheral sound selected based on the implementation of the service routine; and transmitting the loaded peripheral sound to the user.

13. The method according to claim 12 wherein the peripheral sound is in a range other than 200–2,000 Hz.

14. The method according to claim 12 wherein the step of implementing the service routine includes implementing the e-mail service routine, which in turn includes, decoding the user identification and time the user entered within the range of the sensor;

querying an e-mail queue of the user;

determining a level of messages in the queue, wherein the levels of messages are defined from level 1 through level n;

selecting the peripheral sound that has been previously defined to correspond the level of messages determined to be in the queue.

15. The method according to claim 12 wherein the step of determining the levels of messages defined as level 1 through level n include at least, determining that the messages in the queue are less than a little, between a little and a lot, or greater then a lot, as defined by the system.

16. The method according to claim 12 wherein the step of implementing includes the steps of:

checking for e-mail messages within the queue defined as important;

selecting the peripheral sound that has been previously defined to correspond to the existence of an important message in the queue.

17. The method according to claim 12 wherein the step of implementing includes the steps of:

determining that the user is at a location assigned to a person other than the user;

determining the user and the time the user has been detected at the location assigned to a person other than the user;

determining a last sighting of the person assigned to the location;

comparing the time the user has been detected at the location and the time of the last sighting;

obtaining a time value based on the comparison;

determining whether the last sighting was within a time period 1 through a time period n;

selecting the peripheral sound that has been previously defined to correspond to the obtained time period.

18. The method according to claim 11 wherein the time period 1 through the time period n include a time x, a time between time x and a time y, or a time greater than time y.

19. The method according to claim 12 wherein the implementing, loading and transmitting includes, requesting position information from the audio server for n people (p1 . . . pn);

loading by the server a query for a table representing n people;

loading a base peripheral sound of silence into the audio server;

setting an activity level;

determining the activity level based on a value obtained by performing the query on the table;

loading activity peripheral sounds to the audio server based on the determined activity level;

forwarding the loaded peripheral sound to the user; and generating the forwarded peripheral sound such that it is at the auditory periphery of user awareness.

20. The method according to claim 19 wherein the loaded peripheral sound is part of a sonic ecology, where changing behavior is interpreted through semantic roles played by peripheral sounds.

21. The method according to claim 12, wherein the type of service routines include at least one of footprints, and group pulse, the footprints service routine configured to provide location cues to inform a user, via the peripheral auditory signal, as to a recency another person has been at a location, and the group pulse routine configured to provide the user, via the peripheral auditory signal, with a sense of an activity level of a defined group of users.

22. The method according to claim 12, wherein the peripheral auditory signal is in a signal range other than in a subliminal signal range and other than a signal within a full conscious area of a person's recognition.

23. A system providing audio augmentation within a defined physical environment wherein at least one user utilizes an active badge which emits an identification, the system comprising:

means for detecting data emitted from the active badge;

means for determining the user of the active badge and a location of the user wherein based on the location data it is determined the user is at a location assigned to a person other than the user;

means for determining the user and a time the user has been detected at the location assigned to the person other than the user;

means for determining a last sighting time of the person assigned to the location;

means for comparing the time the user has been detected at the location and the last sighting;

means for determining whether the last sighting was within a time period 1 through a time period n;

means for selecting a service routine to be implemented based on the user and the location of the user;

means for implementing the selected service routine;

means for loading a selected peripheral sound to the audio server based on the selected service routine, wherein the selected peripheral sound corresponds to the obtained time period; and means for transmitting the loaded peripheral sound to the user.

* * * * *